US012662912B2

(12) United States Patent
Rhyne et al.

(10) Patent No.: US 12,662,912 B2
(45) Date of Patent: Jun. 23, 2026

(54) APPARATUS AND METHODS FOR AN EROSION CONTROL COATING ON AN INTERIOR SURFACE OF PRODUCTION EQUIPMENT

(71) Applicant: Chevron U.S.A. Inc., San Ramon, CA (US)

(72) Inventors: Lee David Rhyne, Cypress, TX (US); Nicole Jeanette Bernstein Sharma, Houston, TX (US); Hariprasad Janakiram Subramani, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 18/841,672

(22) PCT Filed: Mar. 9, 2022

(86) PCT No.: PCT/US2022/019434
§ 371 (c)(1),
(2) Date: Aug. 26, 2024

(87) PCT Pub. No.: WO2023/172255
PCT Pub. Date: Sep. 14, 2023

(65) Prior Publication Data
US 2025/0163779 A1     May 22, 2025

(51) Int. Cl.
E21B 41/02 (2006.01)
F15D 1/00 (2006.01)
F16L 57/06 (2006.01)

(52) U.S. Cl.
CPC ............ E21B 41/02 (2013.01); F15D 1/0045 (2013.01); F16L 57/06 (2013.01)

(58) Field of Classification Search
CPC ...... E21B 41/02; F15D 1/0045; F15D 1/0085; F15D 1/06; F16L 57/06; F16L 58/00; F16L 58/02; F16L 9/04; F16L 58/04
See application file for complete search history.

(56) References Cited

U.S. PATENT DOCUMENTS

| | | | | |
|---|---|---|---|---|
| 2,105,124 A | * | 1/1938 | Little | F16L 57/06 138/143 |
| 4,269,872 A | | 5/1981 | Erickson | |

(Continued)

FOREIGN PATENT DOCUMENTS

| | | |
|---|---|---|
| CN | 110792868 A | 2/2020 |
| CN | 111649033 A | 9/2020 |
| WO | WO-2020/176272 A2 | 9/2020 |

OTHER PUBLICATIONS

International Search Report and Written Opinion for PCT/US2022/019434 dated Oct. 17, 2022.

(Continued)

Primary Examiner — Sarang Afzali
Assistant Examiner — Darrell C Ford
(74) Attorney, Agent, or Firm — King & Spalding LLP

(57) ABSTRACT

A technique for reducing erosion on the interior of a production component of a well system involves coating the interior of the production component with a series of ribs and grooves. The coating can be a non-metallic material in which the ribs and grooves are formed. The coating can also be applied as a series of ribs that are attached to the interior surface of the production component. The series of ribs can be made of alternating materials that have a different hardness causing the ribs to wear at different rates.

10 Claims, 10 Drawing Sheets

Portion 105
of elbow

Flow Direction
of
Produced Fluid

Coating
110

Longitudinal
length of ribs
and grooves 112
wall

(56)           References Cited

U.S. PATENT DOCUMENTS

| | | | |
|---|---|---|---|
| 5,454,402 A * | 10/1995 | Andre | F16L 58/1018 |
| | | | 138/135 |
| 6,265,039 B1 * | 7/2001 | Drinkwater | B29C 61/0658 |
| | | | 428/36.1 |
| 2002/0160117 A1 * | 10/2002 | Janicki | F16L 57/06 |
| | | | 427/236 |
| 2008/0254244 A1 * | 10/2008 | Yamaguchi | F16L 57/06 |
| | | | 428/36.1 |
| 2011/0220348 A1 | 9/2011 | Jin | |
| 2020/0096150 A1 * | 3/2020 | Carpigiani De Almeida | ........... |
| | | | F16L 11/12 |
| 2020/0400254 A1 * | 12/2020 | Chu | F16L 11/11 |

OTHER PUBLICATIONS

Erosion Control Technology For Production Debottlenecking, Aug. 13, 2019, https://insights.worley.com/en/who-we-are/news/news-2019/erosion-control-technology-for--production-debottleneck-ing#.

* cited by examiner

Portion 105
of elbow

Flow Direction
of
Produced Fluid

Coating
110

Longitudinal
length of ribs
and grooves 112
wall groove
114 rib
116

3 mm 1 mm
depth width

Upward Distribution of Particles

Produced Fluid Flow

Coating 110

Particles injected

Particles Concentrated Along Pipe Surface

Produced Fluid Flow

Particles injected

Uncoated 111 pipe

Apply non-metallic coating to interior surface of wall of component
1405

Allow non-metallic coating to set
1410

Form grooves in non-metallic coating by rifling, raking, or molding
1415

Component is ready for use as a component of production equipment
1420

1400

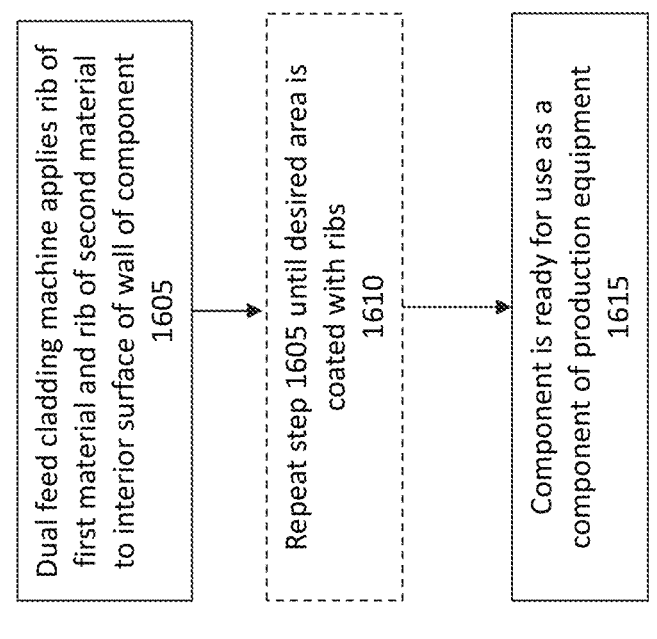

1600

Dual feed cladding machine applies rib of first material and rib of second material to interior surface of wall of component
1605

Repeat step 1605 until desired area is coated with ribs
1610

Component is ready for use as a component of production equipment
1615

FIG. 16

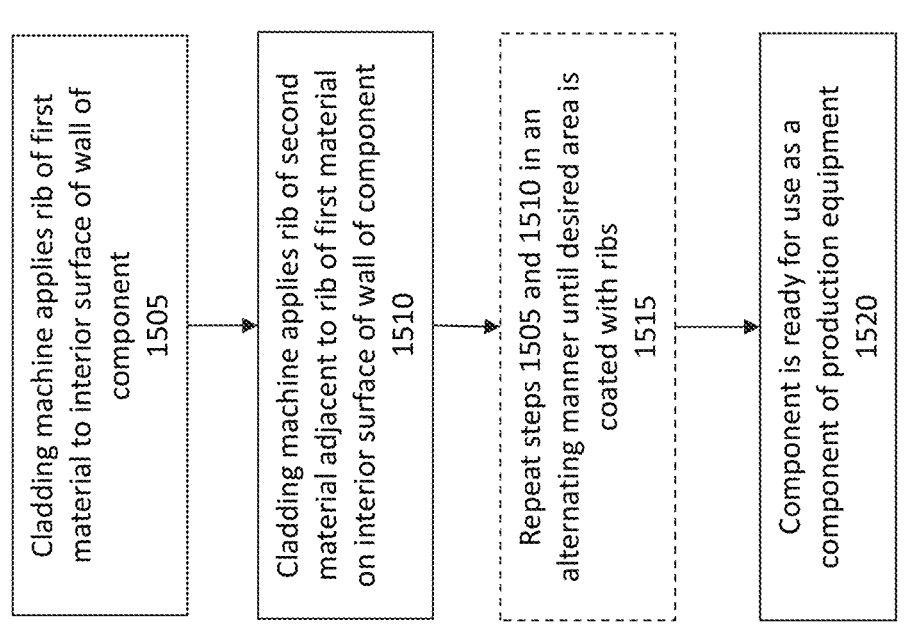

1500

Cladding machine applies rib of first material to interior surface of wall of component
1505

Cladding machine applies rib of second material adjacent to rib of first material on interior surface of wall of component
1510

Repeat steps 1505 and 1510 in an alternating manner until desired area is coated with ribs
1515

Component is ready for use as a component of production equipment
1520

FIG. 15

APPARATUS AND METHODS FOR AN EROSION CONTROL COATING ON AN INTERIOR SURFACE OF PRODUCTION EQUIPMENT

CROSS REFERENCE TO RELATED APPLICATIONS

The present application is a national phase application of and claims the benefit of PCT Patent Application No. PCT/US2022/019434 filed Mar. 9, 2022, the entire content of which is incorporated herein by reference.

TECHNICAL FIELD

Embodiments of the technology relate generally to an erosion control texture on an interior surface of a pipe.

BACKGROUND

Wells are drilled into land and subsea formations in order to produce resources such as hydrocarbons and water. When conducting well production operations, the presence of particulate solids, such as sand, in the produced fluid stream from the well presents challenges for the operations. The presence of particles in the fluid stream can harm and erode equipment and slow down the efficiency of the production operations. Situations such as water breakthrough in a well, failure of a gravel pack, and flowback in a hydraulic fracturing operation can contribute to sand in the fluid stream.

The presence of sand in the produced fluid stream during hydraulic fracturing operations can be particularly problematic. Hydraulic fracturing stimulates oil production by pumping sand slurry into a well at high pressure. The high pressure causes fractures to open in the reservoir surrounding the well and the fractures become filled with sand. The sand props the fractures open when the pumping pressure is reduced. The sand propping open the fractures increases the permeability and available surface area of the reservoir to promote oil drainage into the well. During flowback and oil production, significant quantities of sand used in the hydraulic fracturing operation are produced in the fluid stream from the well. The presence of sand in the produced fluid stream causes erosion damage to the production equipment. Erosion is particularly troublesome at locations where the flow of the produced fluid stream changes direction, such as at elbows, tees, manifolds, and momentum breakers. Erosion of production equipment is expensive because it requires parts to be replaced and causes disruption in the operation of the production from the well. Furthermore, erosion along the interior surfaces of production equipment can be difficult to detect and assess.

Accordingly, there is a need for techniques that minimize the problem of erosion caused by sand in well production equipment. In particular, techniques that can be easily implemented in pipe and other production equipment would be beneficial. Furthermore, techniques that inhibit erosion and that can be applied cost-effectively in production equipment for both land and subsea wells would be desirable.

SUMMARY

The present disclosure is generally directed to applying a coating of ribs and grooves to an interior surface of production equipment to inhibit erosion. In one example, embodiment, the present disclosure is directed to a method of coating a production component for conveying a produced fluid from a well, wherein the produced fluid flows in a flow direction within the production component, the method comprising: applying a non-metallic coating to a wall of the production component, the wall having an interior surface and comprising a base material, the wall of the production component having a shape that contains the produced fluid flowing in the flow direction; and forming a plurality of grooves and a plurality of ribs in the non-metallic coating. Each of the plurality of grooves is disposed between two of the plurality of ribs, and the plurality of grooves and the plurality of ribs each has a longitudinal length that is crosswise to the flow direction.

The foregoing method can include one or more of the following features. The production equipment can be one of an elbow connection, a T connection, a manifold, and a momentum breaker. The plurality of parallel grooves can be formed in the non-metallic coating by one of rifling, raking, or molding. The plurality of grooves can have an average maximum depth and each of the plurality of ribs can have an average maximum width, wherein the average maximum depth of the plurality of grooves is in the range of 1-3 millimeters and the average maximum width of the plurality of ribs is in the range of 1-3 millimeters. In the foregoing method, the ratio of the average maximum depth of the plurality of grooves to the average maximum width of the ribs is in the range from 1:5 to 1:1. In another example of the foregoing method, each of the plurality of grooves can have an average maximum width and each of the plurality of ribs can have an average maximum width, wherein the average maximum width of the plurality of grooves is less than seven times the average maximum width of the plurality of ribs.

In another example embodiment, the present disclosure is directed to a production component for conveying a produced fluid from a well, wherein the produced fluid flows in a flow direction within the production component, the production component comprising: a wall of the production component, the wall comprising a base material and having an interior surface, the wall of the production component having a shape that contains the produced fluid flowing in the flow direction; and a non-metallic coating attached to the interior surface of the wall of the production component, the non-metallic coating comprising a plurality of grooves and a plurality of ribs. Each of the plurality of grooves is disposed between two of the plurality of ribs, and the plurality of grooves and the plurality of ribs each has a longitudinal length that is crosswise to the flow direction.

The foregoing production component can include one or more of the following features. The production equipment can be one of an elbow connection, a T connection, a manifold, and a momentum breaker. The plurality of parallel grooves can be formed in the non-metallic coating by one of rifling, raking, or molding. The plurality of grooves can have an average maximum depth and each of the plurality of ribs can have an average maximum width, wherein the average maximum depth of the plurality of grooves is in the range of 1-3 millimeters and the average maximum width of the plurality of ribs is in the range of 1-3 millimeters. In the foregoing production component, the ratio of the average maximum depth of the plurality of grooves to the average maximum width of the ribs is in the range from 1:5 to 1:1. In another example of the foregoing production component, each of the plurality of grooves can have an average maximum width and each of the plurality of ribs can have an average maximum width, wherein the average maximum width of the plurality of grooves is less than seven times the average maximum width of the plurality of ribs.

In yet another example embodiment, the present disclosure is directed to a method of coating a production component for conveying a produced fluid from a well, wherein the produced fluid flows in a flow direction within the production component, the method comprising: applying a first plurality of ribs to a wall of the production component, the wall having an interior surface and comprising a base material, the wall of the production component having a shape that contains the produced fluid flowing in the flow direction; and applying a second plurality of ribs to the wall of the production component, wherein the first plurality of ribs and the second plurality of ribs are applied to the wall to produce an alternating pattern wherein each of the second plurality of ribs is adjacent to one of the first plurality of ribs. The first plurality of ribs and the second plurality of ribs form a plurality of grooves with each of the plurality of grooves disposed between one of the first plurality of ribs and one of the second plurality of ribs, and the first plurality of ribs comprises a first material and the second plurality of ribs comprises a second material, the second material being different from the first material.

The foregoing method can include one or more of the following features. The first material can have a different hardness relative to the second material producing different wear rates between the first material and the second material. Each of the plurality of grooves can have an average maximum depth and each of the first plurality of ribs and the second plurality of ribs can have an average maximum width, and wherein the average maximum depth of the plurality of grooves is in the range of 1-3 millimeters and the average maximum width of the first plurality of ribs and the second plurality of ribs is in the range of 1-3 millimeters. The first plurality of ribs and the second plurality of ribs can be applied by a cladding machine in an alternating manner wherein during a first pass of the cladding machine one of the first plurality of ribs is applied and during a second pass of the cladding machine one of the second plurality of ribs is applied. Alternatively, the first plurality of ribs and the second plurality of ribs can be applied by a dual feed cladding machine that applies one of the first plurality of ribs and one of the second plurality of ribs during a single pass.

In another example embodiment, the present disclosure is directed to a production component for conveying a produced fluid from a well, wherein the produced fluid flows in a flow direction within the production component, the production component comprising: a wall of the production component, the wall comprising a base material and having an interior surface, the wall of the production component having a shape that contains the produced fluid flowing in the flow direction; a first plurality of ribs attached to the interior surface of the wall of the production component; and a second plurality of ribs attached to the interior surface of the wall of the production component, wherein the first plurality of ribs and the second plurality of ribs are attached to the wall in an alternating pattern wherein each of the second plurality of ribs is adjacent to one of the first plurality of ribs. The first plurality of ribs and the second plurality of ribs form a plurality of grooves with each of the plurality of grooves disposed between one of the first plurality of ribs and one of the second plurality of ribs, and the first plurality of ribs comprises a first material and the second plurality of ribs comprises a second material, the second material being different from the first material.

The foregoing production component can include one or more of the following features. The first material can have a different hardness relative to the second material producing different wear rates between the first material and the second material. Each of the plurality of grooves can have an average maximum depth and each of the first plurality of ribs and the second plurality of ribs can have an average maximum width, and wherein the average maximum depth of the plurality of grooves is in the range of 1-3 millimeters and the average maximum width of the first plurality of ribs and the second plurality of ribs is in the range of 1-3 millimeters. The first plurality of ribs and the second plurality of ribs can be applied by a cladding machine in an alternating manner wherein during a first pass of the cladding machine one of the first plurality of ribs is applied and during a second pass of the cladding machine one of the second plurality of ribs is applied. Alternatively, the first plurality of ribs and the second plurality of ribs can be applied by a dual feed cladding machine that applies one of the first plurality of ribs and one of the second plurality of ribs during a single pass.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of apparatus and methods for erosion control on an interior surface of production equipment and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

FIG. 15 illustrates a method for applying ribs of different material to an interior surface of a production component in accordance with an example embodiment of the disclosure.

FIG. 16 illustrates another method for applying ribs of different material to an interior surface of a production component in accordance with an example embodiment of the disclosure.

DETAILED DESCRIPTION OF EXAMPLE EMBODIMENTS

Figure 1:
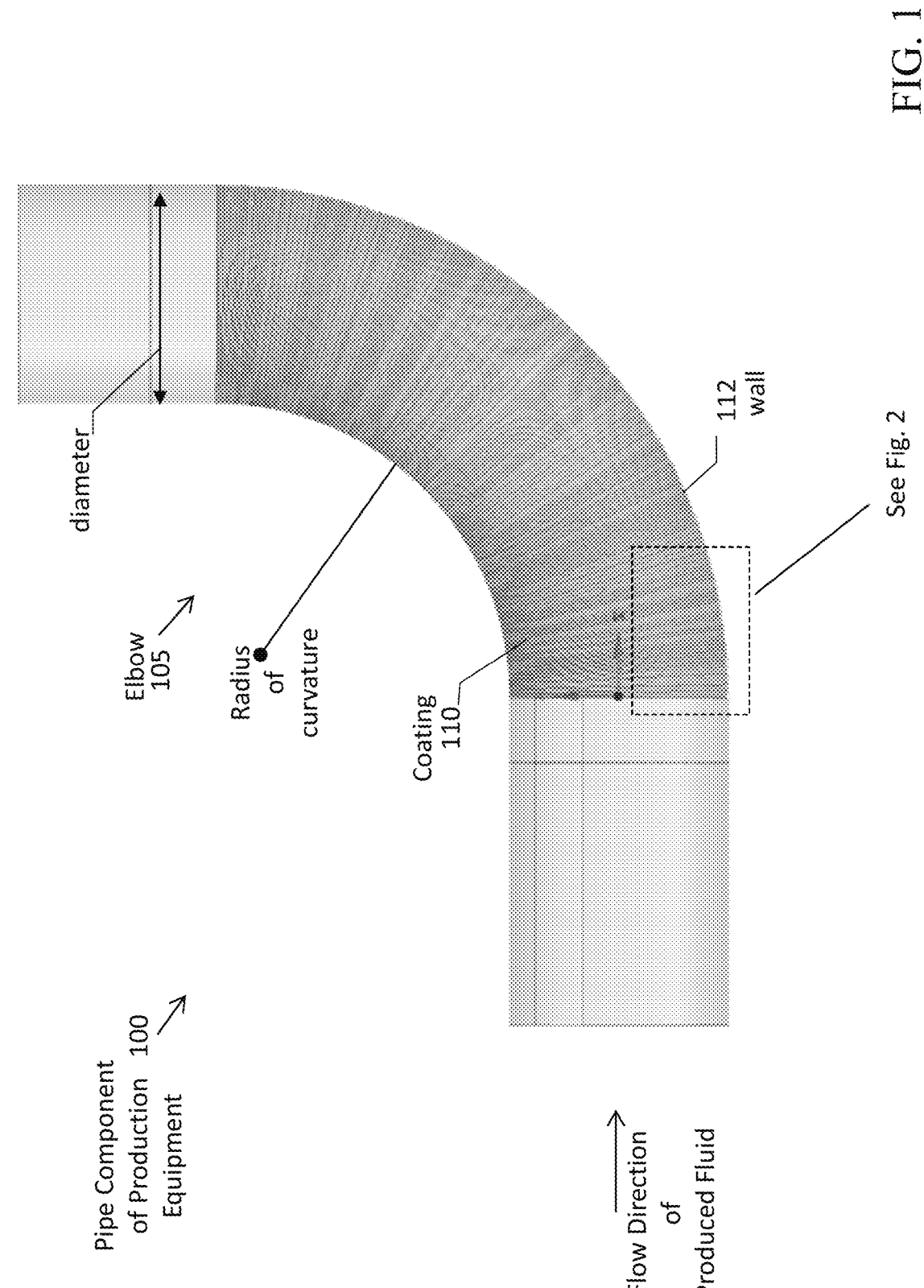
FIG. 1 is a cross-sectional illustration of an elbow pipe component that has a coating in accordance with an example embodiment of the disclosure.

The example embodiments discussed herein are directed to apparatus and methods for an erosion control coating on an interior surface of production equipment. The example embodiments described herein can inhibit erosion caused by particles such as sand flowing in a fluid stream within the production equipment. The example embodiments improve upon prior approaches to inhibiting erosion, which can be categorized as avoidance, allowance, and resistive coatings.

In the avoidance approach to addressing erosion, the geometries of piping and other production equipment are altered to cause more gradual changes in the direction of the fluid stream flowing within the piping or production equipment. For example, a standard elbow in piping is modified so that the elbow's radius of curvature is increased to 5 or 10 times the diameter of the piping, thereby decreasing the volume of sand impinging upon and eroding the interior of the piping as the fluid stream flows through the more gradual bend of the elbow. The geometry of piping also can be changed to increase the diameter of the piping to reduce the velocity of the fluid stream and thereby reduce the force within which sand impinges upon the interior of the piping. The drawbacks with these avoidance approaches are that they require more material and space, which can be cost prohibitive and which can be impractical for offshore production facilities where space is limited.

The allowance approach accepts that the sand will cause erosion within the production equipment and counteracts the erosion with thicker walls of the piping and production equipment. The rate of erosion depends upon the size and shape of the sand particles, the velocity of the sand particles flowing in the fluid stream, and other variables, however, erosion rates of centimeters per year of material eroded from the production equipment are common. Moreover, the amount of sand flowing in the fluid stream and the resulting erosion rate is difficult to predict. Therefore, manufacturing production equipment with thicker walls that are sufficient to withstand erosion is an expensive proposition with significant guesswork involved. Additionally, thicker walls result in heavier production equipment that can be impractical for offshore production facilities. Accordingly, the allowance approach is an unsatisfactory solution to the erosion problem.

The third category of the approaches to addressing erosion involves applying resistive coatings to the interior surfaces of production equipment to resist erosion. The resistive coatings are typically materials having a hardness greater than sand, such as tungsten carbide or diamondoids. These materials are expensive and difficult to apply to the interior surfaces of production equipment. Additionally, these materials typically have material properties significantly different from the base material of the production equipment which can lead to problems such as thermal cracking and separation due to different thermal profiles when the base material and the resistive coating are subjected to temperature changes. Given these shortcomings, resistive coatings have been found to be unsatisfactory in addressing erosion in production equipment.

As an alternative to the previously described prior approaches, the apparatus and methods of the embodiments described herein modify the nature of the flow of the produced fluid passing over the production equipment to inhibit erosion. Specifically, a coating is applied to a portion of the production equipment that is susceptible to erosion. However, in contrast to the previously described resistive coatings, the coating is applied so that it has a plurality of ribs separated by a groove between each rib. When the produced fluid passes over the coating, the contour of the ribs and grooves creates greater turbulence along the surface of the coating which in turn creates greater velocities directed away from the surface of the coating. The turbulence and greater velocities distribute particles in the produced fluid away from the surface of the coating, thereby reducing the number of particles contacting the coated surface and reducing erosion.

The contoured coating is more effective at reducing erosion than the previously described resistive coatings. Additionally, the contoured coating can eliminate the complexities involved with prior resistive coatings involving coating materials having different thermal properties than the base production component which leads to cracking and/or separation of the coating from the base. The ribs of the contoured coating can use a material that is the same or similar to the material of the base thereby avoiding the thermal stresses that arise when joining two materials having different thermal profiles. As an example, carbon steel is typically used for pipe segments and other components of production equipment. Applying the contoured coating approach of the present application, carbon steel also can be used for the ribs that are applied to create the contoured coating on the interior surface of the production component. Applying carbon steel ribs is typically simpler than the less common materials used in the past for resistive coatings and avoids the problems that arise when materials with different thermal properties are used.

The example embodiments described herein can provide improved techniques for inhibiting erosion in production equipment. As will be described further in the following examples, the methods and apparatus described herein improve upon prior art approaches to addressing erosion. The techniques described herein provide a less costly and less complicated approach to addressing the problem of erosion in production equipment.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Referring to FIG. 1, a component of production equipment 100 is illustrated. Specifically, FIG. 1 is a cross-sectional illustration of an elbow pipe component 105, which is often used in the production piping associated with producing a natural resource from a well. The production piping transports a produced fluid from a wellhead, a storage tank, or some other source of the produced fluid. As illustrated in FIG. 1, the elbow pipe component 105 has a diameter and a radius of curvature. The elbow pipe component 105 comprises a wall 112 that has an interior surface and an exterior surface. A transparent view of the elbow pipe component 105 is provided in FIG. 1 to illustrate the coating 110 along a portion of the interior surface of the wall 112 of the elbow pipe component 105. The coating 105 can encircle an entire circumference of the interior surface of the elbow pipe component 105 or the coating can be limited to a segment of the interior surface of the elbow pipe. For example, the outer curvature of the interior surface of the elbow pipe component 105 may be more likely to be subjected to abrasion from particles flowing in the produced fluid and, consequently, the coating can be applied only to a targeted area along the outer curvature of the interior surface.

Although a portion of an elbow pipe component is the focus of FIG. 1 and the figures that follow, it should be understood that the coating described herein can be applied to wide variety of equipment that is subject to erosion from particles in a flowing fluid. In the context of production equipment conveying a produced fluid from a well, the example coatings are particularly useful where the flow of the produced fluid changes direction causing a greater volume of particles in the produced fluid to impinge upon and abrade an interior surface of the production equipment. As examples, the coatings described herein can be applied to T-shaped pipe connections, manifolds, momentum breakers or any other section of production equipment that is susceptible to erosion from particles flowing in the produced fluid.

Figures 2, 3:
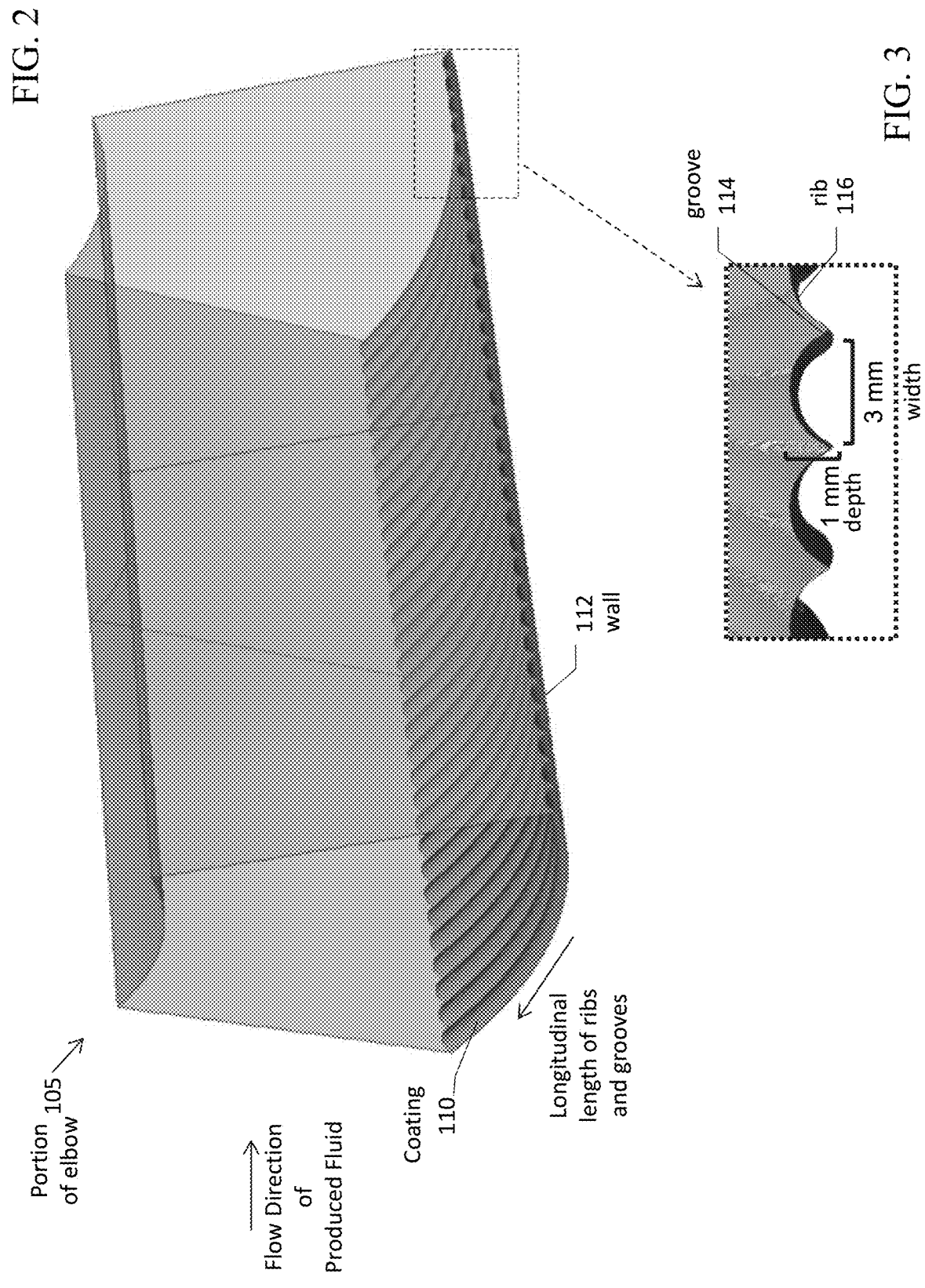
FIG. 2 provides an enlarged illustration of a section of the elbow pipe component of FIG. 1 in accordance with an example embodiment of the disclosure.
FIG. 3 provides a further enlarged illustration of a portion of the elbow pipe component of FIG. 1 in accordance with an example embodiment of the disclosure.

Turning to FIGS. 2 and 3, enlarged views of a portion of the coating 110 of FIG. 1 is illustrated. In FIGS. 2 and 3, the contour of the coating is more readily visible. The example coating 110 comprises a series of ribs 116 and a series of grooves 114 with a groove 114 located between each rib 116. In the example coating 110 of FIGS. 2 and 3 the ribs and grooves are parallel to each other. However, in other embodiments, the ribs and grooves could have a spiral pattern, a wavy pattern, a crisscross pattern, or other patterns. In the example coating 110, the ribs 116 are widest at their base and the cross-sectional shape of the ribs 116 is curved as illustrated in FIG. 3. When referenced herein, the width of the ribs will refer to the widest portion at the base of the ribs, as illustrated in FIG. 3, unless otherwise indicated. Similarly, when the depth of the grooves 114 is referenced herein, the depth is measured as the vertical distance from the highest point of the rib 116 to the base of the groove 114 as illustrated in FIG. 3.

Figures 17, 18, 19:
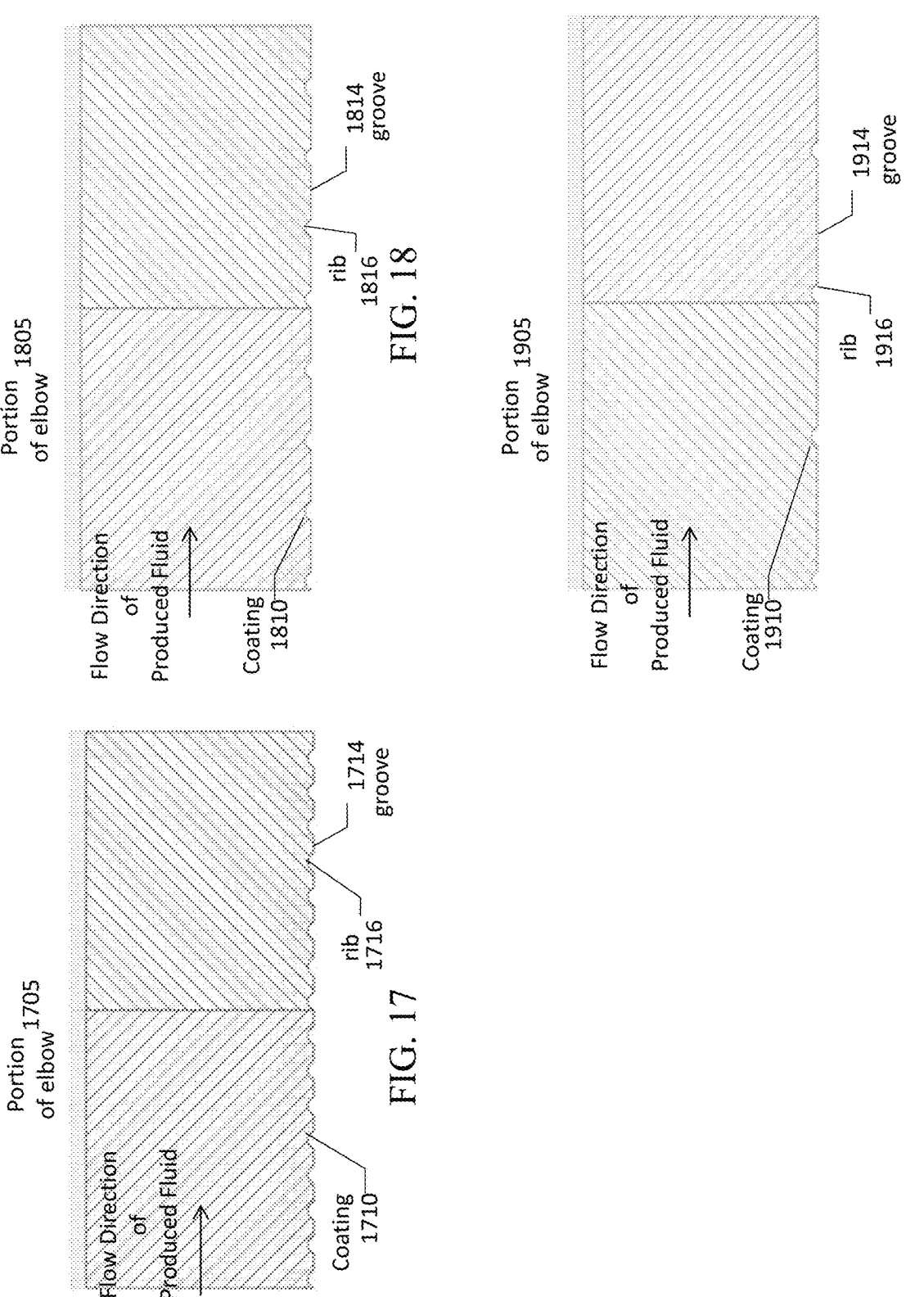
FIG. 17 is a cross-sectional illustration of an elbow pipe component with a coating in accordance with an example embodiment of the disclosure.
FIG. 18 is a cross-sectional illustration of an elbow pipe component with a coating in accordance with an example embodiment of the disclosure.
FIG. 19 is a cross-sectional illustration of an elbow pipe component with a coating in accordance with an example embodiment of the disclosure.

In the example coating 110 of FIGS. 2 and 3, the ribs 116 have a maximum width of 3 mm at their base and the grooves have a maximum depth of 1 mm. It should be understood that these dimensions are only examples and that a range of dimensions for the ribs and grooves can produce the desired effect of altering the flow of the production fluid over the coating to direct particles away from the coating to inhibit erosion. As one example, the range of dimensions can be defined by ratios wherein, at one end of the range, the ratio of the maximum depth of the groove to the maximum width of the rib is 1:5, and at the other end of the range the ratio of the maximum groove depth to the maximum rib width is 1:1. Various dimensions for the width of the ribs and the depth of the grooves are possible to achieve the increased turbulence in the production fluid that directs particles away from the coated wall of the production component as illustrated and described in connection with the additional figures referenced below. As another example, the width of the grooves, in other words the spacing between the ribs, can vary and can still achieve the desired turbulence for directing particles away from the coated wall of the production component. In the example coating illustrated in FIGS. 2 and 3, adjacent ribs are in contact at their bases such that the width of the groove at its lowest point is approximately zero. However, in other embodiments as illustrated in FIGS. 17-19 and as further described below, the spacing between the ribs can be increased.

In addition to the width and depth dimensions, the ribs 116 and grooves 114 have a longitudinal length as indicated in FIG. 2. The longitudinal length is the longest dimension of the ribs and grooves. As described previously, the longitudinal length of the ribs and grooves can extend around the entire circumference of the interior surface of the wall 112 or can extend over only a portion of the circumference.

As illustrated in FIGS. 1-3, the longitudinal length of the ribs 116 and grooves 114 is generally crosswise to the flow direction of the produced fluid. Simulations described in connection with the following figures indicate that a generally crosswise relationship between the longitudinal length of the ribs and grooves and the flow direction of the produced fluid provides the desired effect of directing particles in the flowing produced fluid away from the coating thereby inhibiting erosion. However, other arrangements where the relationship between these two directions is not strictly crosswise can still produce the desired effect upon particles flowing in the produced flow. For example, the groove(s) can be formed in the coating where the groove(s) have a spiral shape, a wavy shape, a crisscrossing pattern, or some other pattern. Accordingly, the embodiments herein should not be interpreted as being limited to arrangements where the longitudinal length of the ribs and grooves is strictly crosswise to the flow direction of the produced fluid.

Figures 4, 5:
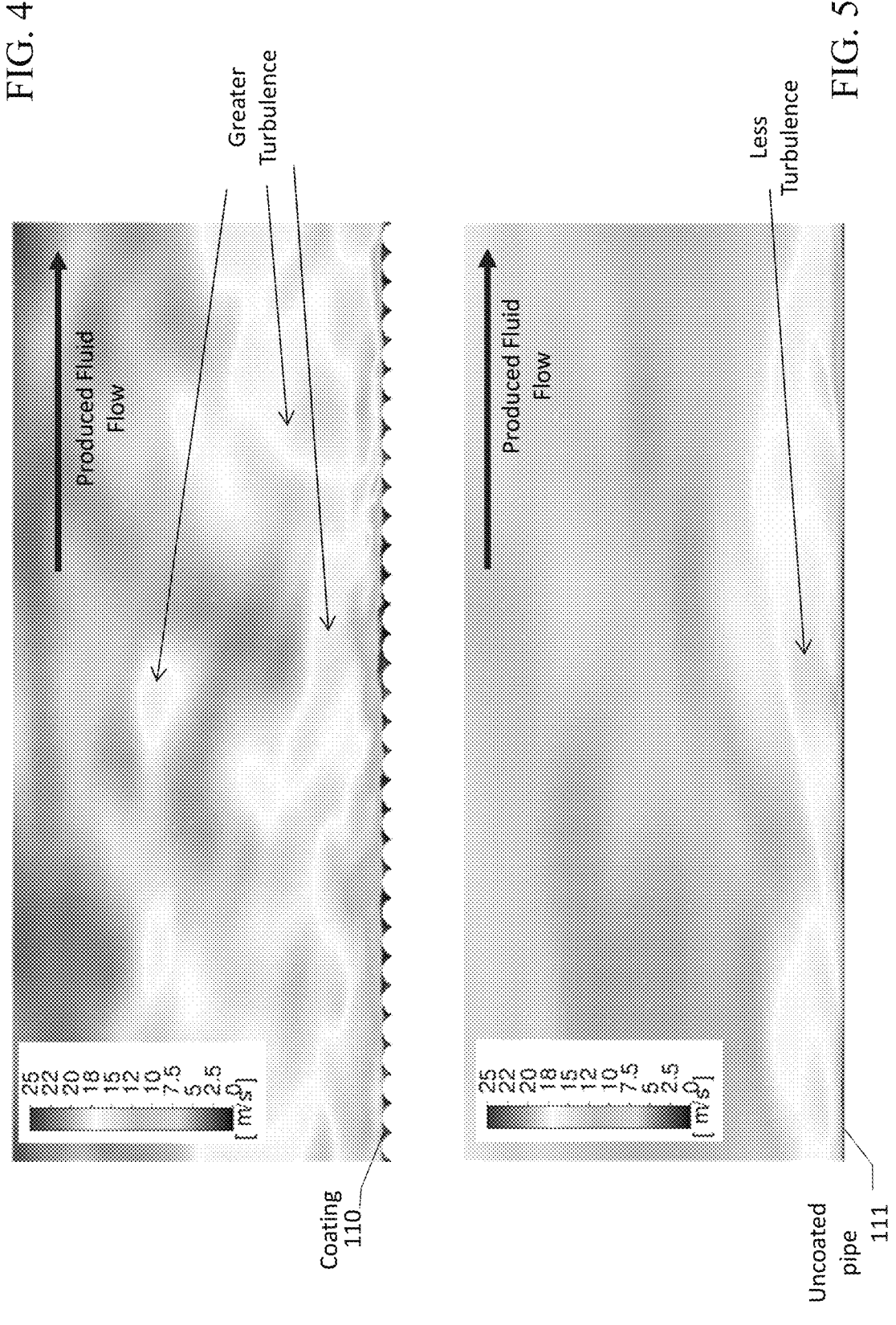
FIG. 4 is an illustration of production fluid velocity from a computational fluid dynamics simulation for a coated pipe component in accordance with an example embodiment of the disclosure.
FIG. 5 is an illustration of production fluid velocity from a computational fluid dynamics simulation for an uncoated pipe component.

FIGS. 4-8 and 10-13 provide illustrations generated from computational fluid dynamics modeling that demonstrate the benefits of the contoured coating described herein. FIGS. 4 and 5 illustrate simulations of the velocity profile for a produced fluid flowing through a pipe. FIG. 4 illustrates a pipe having a coating 110 on its interior surface as described previously with a series of ribs and grooves, whereas FIG. 5 illustrates a pipe 111 without a coating on the interior surface. The velocity profiles for the fluid in each simulation showed areas of greater velocity along the surface of the coating 110 and extending up into the fluid flow away from the coating 110. These areas of greater velocity indicate greater turbulence in the fluid flow in the coated pipe which would have the effect of distributing particles in the flowing fluid away from the coating 110.

Figures 6, 7, 8:
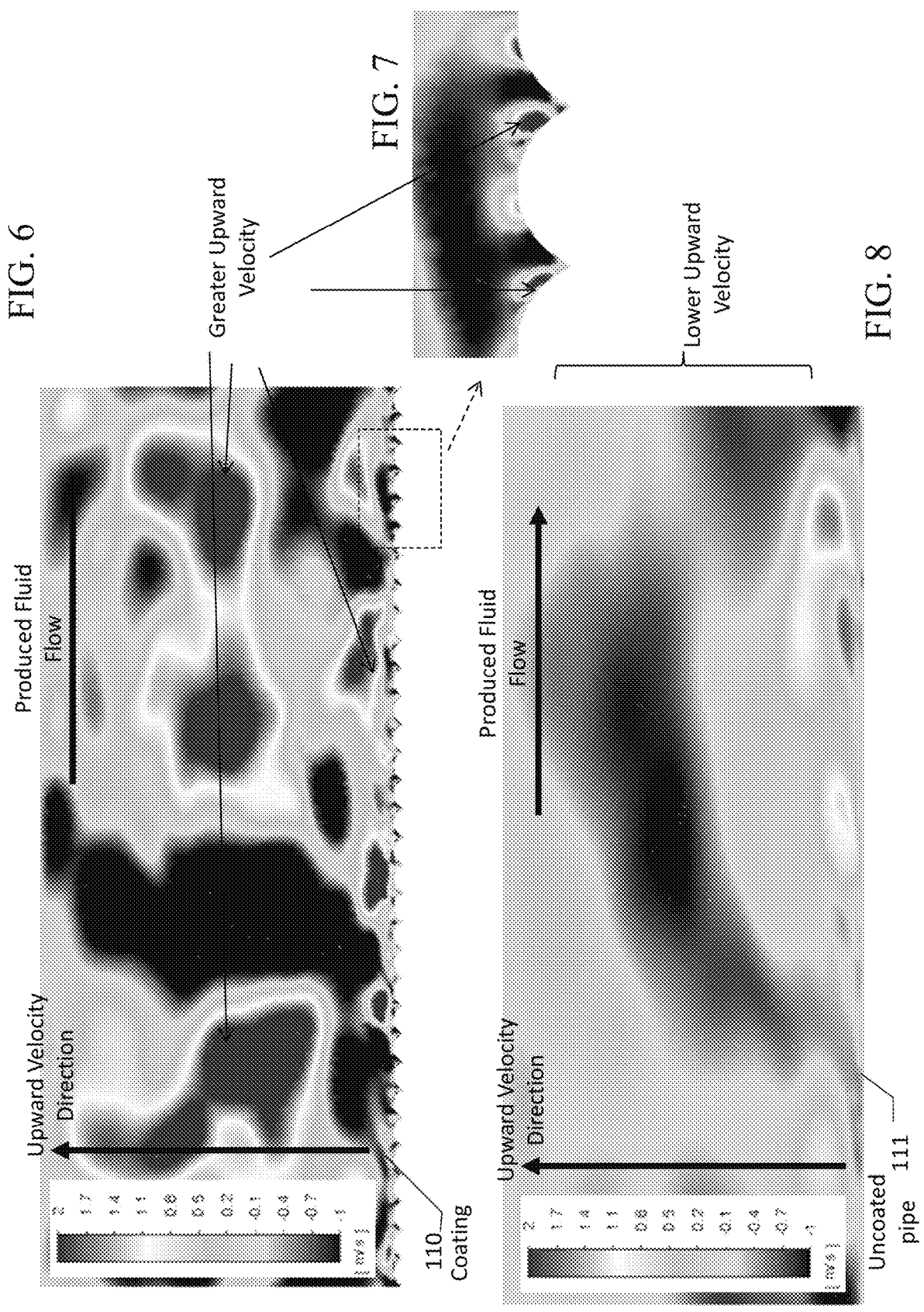
FIG. 6 is an illustration of the upward component of production fluid velocity from a computational fluid dynamics simulation for a coated pipe component in accordance with an example embodiment of the disclosure.
FIG. 7 is an enlarged illustration of a section of the coated pipe of FIG. 6.
FIG. 8 is an illustration of the upward component of production fluid velocity from a computational fluid dynamics simulation for an uncoated pipe component.

FIGS. 6, 7, and 8 further illustrate this point. FIGS. 6, 7, and 8 illustrate the upward velocity of the fluid flow, or the component of the velocity in the direction away from the bottom wall of the pipe. As with FIGS. 4 and 5, FIG. 6 shows a simulation for a pipe with coating 110 along the interior surface of the bottom wall of the pipe, whereas FIG. 8 provides a simulation for a pipe 111 without a coating along the interior surface. As noted in FIG. 6, the simulation shows large regions of greater upward velocity for the pipe with the coating 110. Of particular note as illustrated in FIG. 7, there are areas of greater upward velocity on the downstream sides of the ribs. These areas of greater upward velocity illustrated in FIGS. 6 and 7 direct particles in the produced fluid away from the coated wall thereby reducing erosion at the wall. In contrast, FIG. 8 shows relatively few areas of greater upward velocity when the wall of the production component is uncoated.

Figure 9:
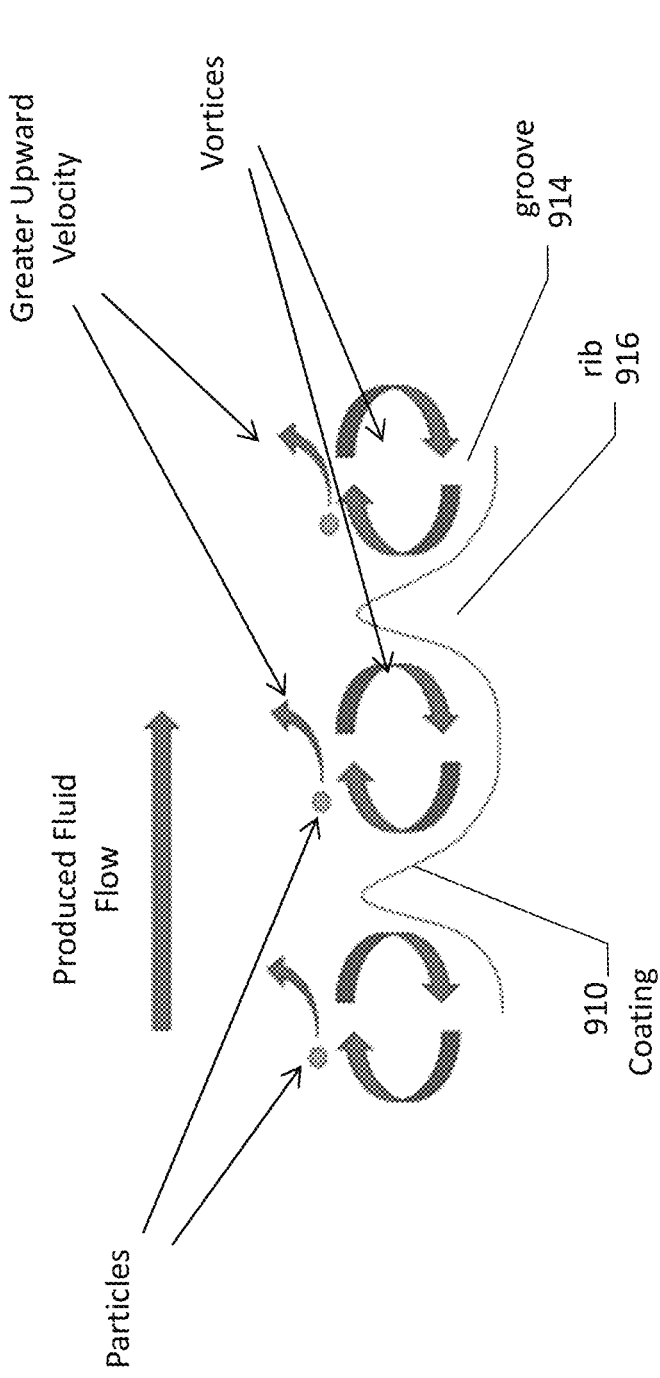
FIG. 9 is an illustration of the vortices that develop in grooves between ribs of the coating on a pipe component in accordance with an example embodiment of the disclosure.

FIG. 9 illustrates the effect on particles flowing in a produced fluid from the areas of greater upward velocity located on the downstream sides of the ribs. FIG. 9 shows a coating 910 applied to the interior surface of a wall of a production component, such as an elbow connection. Similar to the coatings previously described, coating 910 includes a series of ribs 916 and a series of grooves 914 in an alternating arrangement. The contour of the ribs 916 and grooves 914 creates vortices in the fluid that flows into the grooves 914 and the vortices create regions of greater upward velocity in the fluid flow. These regions of greater upward velocity direct the particles in the produced fluid upward and away from the coated wall thereby reducing erosion.

Figures 10, 11:
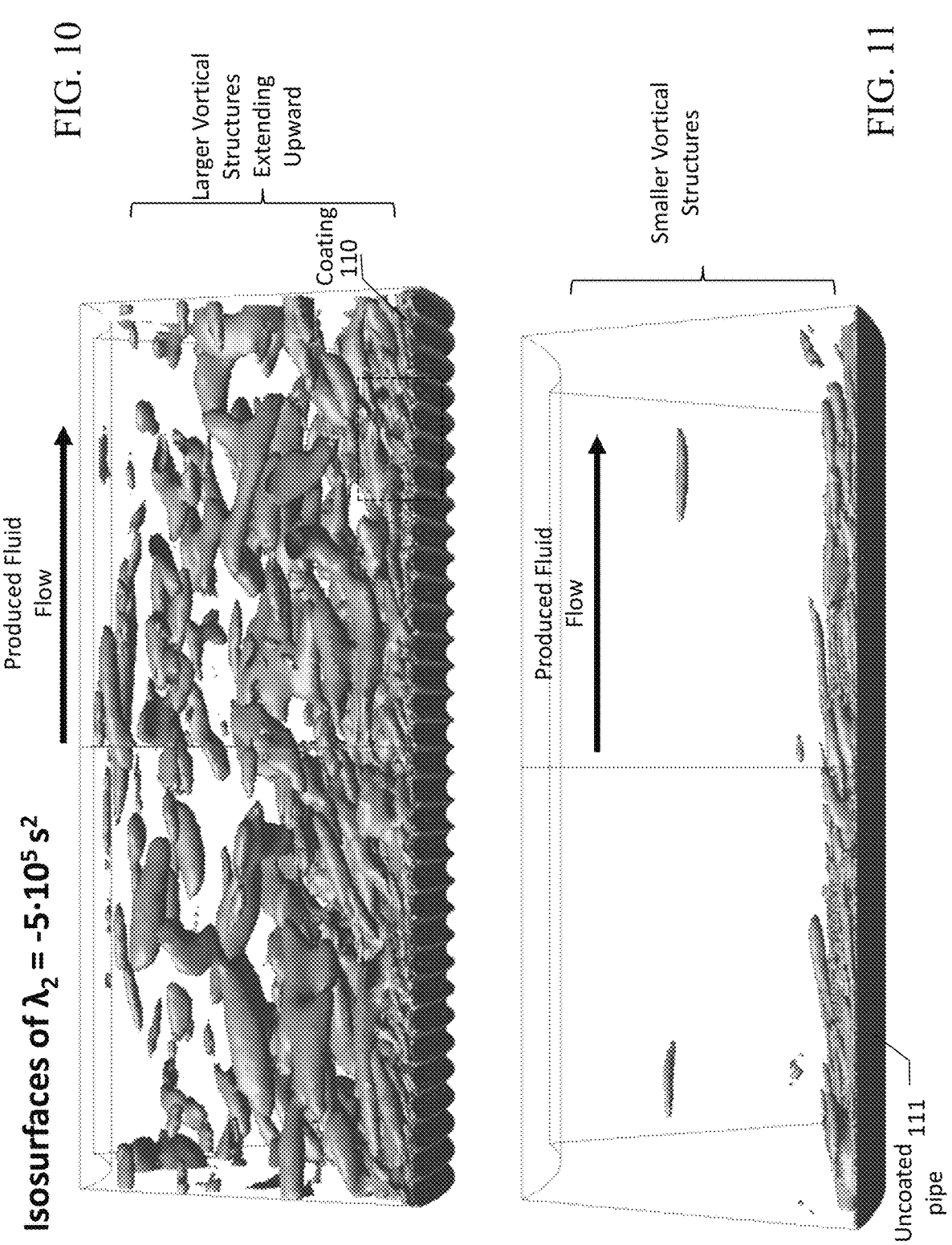
FIG. 10 is an illustration of the vortical structures from a computational fluid dynamics simulation for a coated pipe component in accordance with an example embodiment of the disclosure.
FIG. 11 is an illustration of the vortical structures from a computational fluid dynamics simulation for an uncoated pipe component.

Similar to FIGS. 4-8, FIGS. 10 and 11 illustrate the contrast between a coated pipe and an uncoated pipe. FIGS. 10 and 11 were generated from the previous-referenced computational fluid dynamics simulation and these figures show the vortical structures present in the produced fluid. FIG. 10 shows many large vortical structures distributed throughout the produced fluid that are created by the coating 110 on the interior wall of the production component. In contrast, the uncoated pipe 111 illustrated in FIG. 11 generates fewer and smaller vortical structures that are clustered near the wall of the production component.

Figures 12, 13:
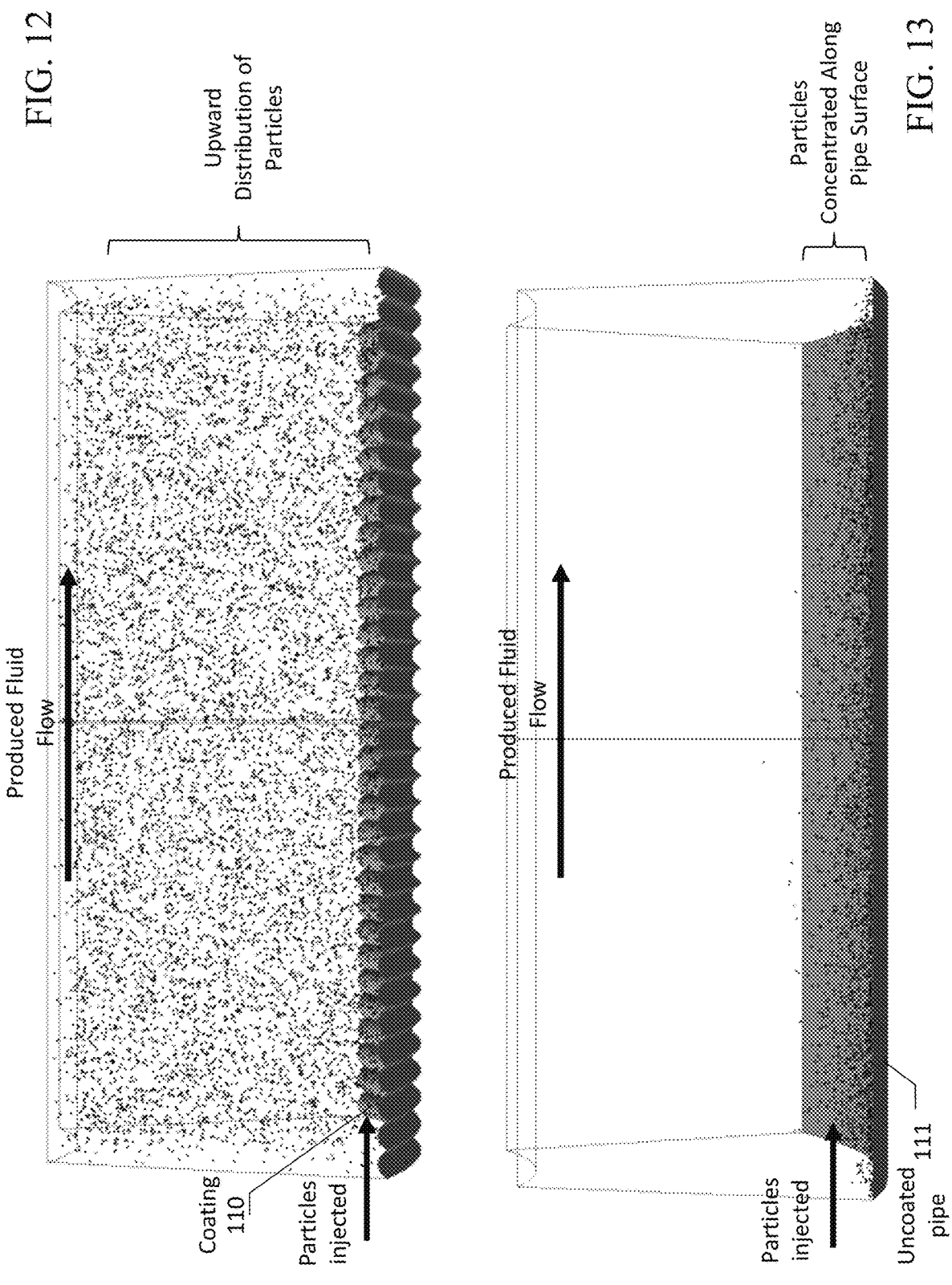
FIG. 12 is an illustration of a distribution of sand particles in a production fluid from a computational fluid dynamics simulation for a coated pipe component in accordance with an example embodiment of the disclosure.
FIG. 13 is an illustration of a distribution of sand particles in a production fluid from a computational fluid dynamics simulation for an uncoated pipe component.

FIGS. 12 and 13 provide a final set of illustrations generated from the computation fluid dynamics simulation. In these simulations, as shown in FIGS. 12 and 13, the particles were injected into the produced fluid flow proximate to the wall in each case at a distance of 2-3 mm from the wall of the elbow connection. Comparing the two illustrations shows a much greater distribution of particles in the upward direction away from the coated wall in FIG. 11. It is believed this greater distribution of particles away from the coated wall is attributed to the greater upward velocities caused by the contour of the ribs and grooves in the coating. In contrast, the uncoated pipe 111 shown in FIG. 13 shows the particles concentrated along the uncoated wall because there are fewer vortices generating upward velocities to push the particles away from the wall. In FIG. 13, the majority of the particles remain in close proximity to the uncoated wall where they are more likely to abrade the wall and contribute to erosion.

Figure 14:
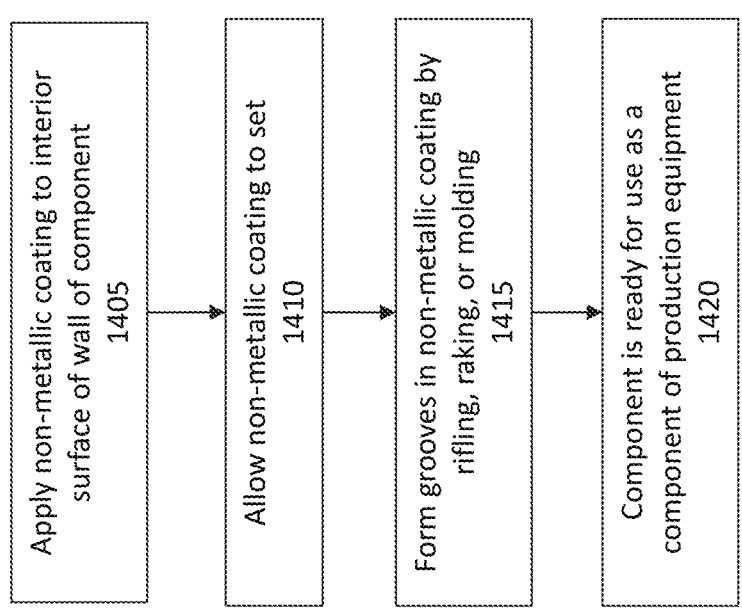
FIG. 14 illustrates a method for applying a non-metallic coating to an interior surface of a production component in accordance with an example embodiment of the disclosure.

FIGS. 14, 15, and 16 illustrate example methods for applying a coating, such as the coatings described in the previous examples, to an interior surface of a wall of a production component. It should be understood that the methods of FIGS. 14, 15, and 16 are non-limiting examples and in alternate embodiments certain steps of these methods may be modified or omitted. Referring to FIG. 14, an example method 1400 is provided for applying a non-metallic coating to a component of production equipment. The non-metallic coating can be a polymer or composite suitable for attaching to the interior of production equipment. In operation 1405, the non-metallic coating is applied to the interior surface of a wall of the production component. The non-metallic coating can be applied by hand or by a machine. In certain embodiments, an adhesive or other bonding material can be used to affix the non-metallic coating to the interior surface. In operation 1410, the non-metallic coating is allowed to set in position on the interior surface. In the setting step of 1410, the coating may partially harden or may completely harden. In operation 1415, grooves are formed in the non-metallic coating resulting in a series of alternating ribs and grooves in the coating similar to those illustrated previously in FIGS. 1-3. The grooves can be formed by a variety of machines and methods, including rifling, raking, or molding. In operation 1420, once the non-metallic coating has a contour or ribs and grooves, the component is ready for installation in production equipment wherein erosion will be inhibited on the interior of the component due to the presence of the contoured coating.

FIGS. 15 and 16 illustrate methods of applying a coating in a production component using a cladding machine. Cladding machines are well-known devices that can apply ribs of material to an interior surface of a component. FIG. 15 describes a method 1500 for applying a cladding of ribs using a single-feed cladding machine, whereas FIG. 16 describes a method 1600 for applying a cladding of ribs using a dual-feed cladding machine. In operation 1505, the single-feed cladding machine makes a first pass applying a rib of a first material to the interior surface of a wall of a production equipment component. The rib can be applied to a targeted area on a wall or, alternatively, the rib can be applied over an entire circumference of the interior surface. In operation 1510, the single-feed cladding machine makes a second pass applying a second rib of a second material adjacent to the first rib that was applied in operation 1505. The first material and the second material are different materials having different hardness properties so that they wear at different rates over time as a produced fluid flows over them. The first material and second material can be any combination of metals, non-metals, or composites of metallic and non-metallic materials. By wearing at different rates, the ribs and grooves in the coating will be maintain a contoured pattern for a longer period of time thereby continuing to generate the erosion-inhibiting effect described herein.

If the ribs are applied to the entire circumference of the interior surface, a pass of the cladding machine can include multiple complete rotations that apply a continuous spiral of the rib material along a length of the production pipe. Alternatively, if a pass of the cladding machine applies a rib covering one rotation or less (360 degrees or less) along the interior surface of the production component, multiple passes of the cladding machine would be needed to apply multiple ribs as described in optional operation 1515. In operation 1515, operations 1505 and 1510 can be repeated so that the first material and second material are applied to the interior surface in an alternating manner. In other words, after the first pass and second pass of operations 1505 and 1510, the cladding machine makes a third pass applying a third rib of the first material next to the second rib. Next, the cladding machine makes a fourth pass applying a fourth rib of the second material next to the third rib. Operations 1505 and 1510 can be repeated with the cladding machine making as many passes as needed to apply a sufficient number of ribs to adequately coat the target area. The result of repeating these steps is a coating having a series of ribs with a groove between each rib, similar to that previously illustrated in FIGS. 1-3, wherein the ribs are alternate the first and second materials. Once the target area has been coated with the ribs, the component is ready for use in production equipment in operation 1520.

Method 1600 of FIG. 16 is similar to method 1500 of FIG. 15, but involves a dual-feed cladding machine that can apply two ribs of material with each pass that the cladding machine makes. In operation 1605, the dual-feed cladding machine makes a first pass over the target area of the component applying a first rib of the first material and a second rib of the second material so that the two ribs are next to each other. As with method 1500, the first material and the second material are different materials having different hardness properties that cause them to wear at different rates as a production fluid passes over the ribs. The first material and second material can be any combination of metals, non-metals, or composites of metallic and non-metallic materials. As described for method 1500, the different wear rates for the alternating ribs will extend the life of the contoured pattern that inhibits erosion.

If the dual ribs are applied to the entire circumference of the interior surface, a pass of the cladding machine can include multiple complete rotations that apply a continuous spiral of the two ribs along a length of the production pipe. Alternatively, if a pass of the cladding machine applies the two ribs covering one rotation or less (360 degrees or less) along the interior surface of the production component, multiple passes of the cladding machine would be needed to apply multiple pairs of ribs as described in optional operation 1610. In operation 1610, operation 1605 can be repeated until the target area is covered with the alternating ribs of the first and second materials. The result of repeating these steps is a coating having a series of ribs with a groove between each rib similar to that previously illustrated in FIGS. 1-3. Once the target area has been coated with the ribs, the component is ready for use in production equipment in operation 1615.

As referenced above in connection with FIGS. 2 and 3, in alternate embodiments the spacing between the ribs can vary and can still achieve the desired turbulence to direct particles flowing in the produced fluid away from the walls of the production component, thereby inhibiting erosion. FIGS. 17, 18, and 19 provide cross-sectional views illustrating examples of alternate embodiments in which the width of the groove, in other words the spacing between the ribs, is increased. FIG. 17 provides an illustration of a cross-section of a portion of an elbow 1705 through which a produced fluid can flow. The interior surface of the wall of the elbow 1705 includes a coating of ribs, such as rib 1716, to inhibit erosion of the interior surface. In contrast to the ribs of FIGS. 2 and 3, the ribs in FIG. 17 are not in contact but are spaced apart. In the example of FIG. 17, each groove, such as groove 1714, has an average maximum width at the base of the groove that defines the minimum spacing between the ribs. The average maximum width of each of the grooves in the example of FIG. 17 is equal to the average maximum width of each of the ribs. Simulations with computational fluid dynamics modeling that were performed using the arrangement illustrated in FIG. 17 achieved sufficient turbulence to direct particles away from the coated interior surface of the wall and inhibit erosion.

The example elbow 1805 of FIG. 18 is similar to the elbow of FIG. 17 in that it has a coating 1810 of ribs, such as rib 1816, on the interior surface of the wall of the elbow. However, in FIG. 18, the average maximum width of the grooves, such as groove 1814, is three times greater than the average maximum width of the ribs. Simulations with computational fluid dynamics modeling that were performed using the arrangement illustrated in FIG. 18 achieved sufficient turbulence to direct particles away from the coated interior surface of the wall and inhibit erosion.

The example elbow 1905 of FIG. 19 is similar to the elbows of FIGS. 17 and 18 in that it has a coating 1910 of ribs, such as rib 1916, on the interior surface of the wall of the elbow. However, in FIG. 19, the average maximum width of the grooves, such as groove 1914, is seven times greater than the average maximum width of the ribs. Simulations with computational fluid dynamics modeling that were performed using the arrangement illustrated in FIG. 19 indicated insufficient turbulence was achieved to inhibit erosion due to the wide spacing of the ribs. Accordingly, the examples of FIGS. 17, 18, and 19 indicate that average maximum width of the grooves should be less than seven times greater than the average maximum width of the ribs in order to induce sufficient turbulence to inhibit erosion.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

The term "crosswise" is used herein to refer to a relationship between two directions as generally perpendicular or 90 degrees. It should be understood that variations from perpendicular are encompassed by the term "crosswise" as used herein. For example, a directional relationship within the range of 65 degrees to 115 degrees is considered crosswise as used herein.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

For purposes of the foregoing description and the claims, unless otherwise indicated, all numbers expressing quantities, percentages or proportions, and other numerical values are to be understood as being modified in all instances by the term "about." Accordingly, unless indicated to the contrary, the numerical parameters set forth in the following specification and attached claims are approximations that can vary depending upon the desired properties sought to be obtained by the descriptions herein.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of coating a piping or production component for conveying a fluid stream, wherein the fluid stream flows in a flow direction within the piping or production component, the method comprising:

applying a first plurality of ribs to a wall of the piping or production component, the wall having an interior surface and comprising a base material, the wall of the piping or production component having a shape that contains the fluid stream flowing in the flow direction, wherein the first plurality of ribs extend circumferentially along the interior surface and crosswise to the flow direction; and applying a second plurality of ribs to the wall of the piping or production component, wherein the first plurality of ribs and the second plurality of ribs are applied to the wall to produce an alternating pattern wherein each of the second plurality of ribs is adjacent to one of the first plurality of ribs, wherein the second plurality of ribs extend circumferentially along the interior surface and crosswise to the flow direction, wherein the first plurality of ribs and the second plurality of ribs form a plurality of grooves with each of the plurality of grooves disposed between one of the first plurality of ribs and one of the second plurality of ribs, wherein the plurality of grooves extend circumferentially along the interior surface and crosswise to the flow direction, and wherein the first plurality of ribs comprises a first material and the second plurality of ribs comprises a second material, the second material being different from the first material.

2. The method of claim 1, wherein the first material has a different hardness relative to the second material producing different wear rates between the first material and the second material.

3. The method of claim 1, wherein each of the plurality of grooves has an average maximum depth and each of the first plurality of ribs and the second plurality of ribs has an average maximum width, and wherein the average maximum depth of the plurality of grooves is in the range of 1-3 millimeters and the average maximum width of the first plurality of ribs and the second plurality of ribs is in the range of 1-3 millimeters.

4. The method of claim 1, wherein the first plurality of ribs and the second plurality of ribs are applied by a cladding machine in an alternating manner wherein during a first pass of the cladding machine one of the first plurality of ribs is applied and during a second pass of the cladding machine one of the second plurality of ribs is applied.

5. The method of claim 1, wherein the first plurality of ribs and the second plurality of ribs are applied by a dual feed cladding machine that applies one of the first plurality of ribs and one of the second plurality of ribs during a single pass.

6. A piping or production component for conveying a fluid stream, wherein the fluid stream flows in a flow direction within the piping or production component, the piping or production component comprising:

a wall of the piping or production component, the wall comprising a base material and having an interior surface, the wall of the piping or production component having a shape that contains the fluid stream flowing in the flow direction;

a first plurality of ribs attached to the interior surface of the wall of the piping or production component, wherein the first plurality of ribs extend circumferentially along the interior surface and crosswise to the flow direction; and a second plurality of ribs attached to the interior surface of the wall of the piping or production component, wherein the second plurality of ribs extend circumferentially along the interior surface and crosswise to the flow direction, wherein the first plurality of ribs and the second plurality of ribs are attached to the wall in an alternating pattern wherein each of the second plurality of ribs is adjacent to one of the first plurality of ribs, wherein the first plurality of ribs and the second plurality of ribs form a plurality of grooves with each of the plurality of grooves disposed between one of the first plurality of ribs and one of the second plurality of ribs, wherein the plurality of grooves extend circumferentially along the interior surface and crosswise to the flow direction, and wherein the first plurality of ribs comprises a first material and the second plurality of ribs comprises a second material, the second material being different from the first material.

7. The piping or production component of claim 6, wherein the first material has a different hardness relative to the second material producing different wear rates between the first material and the second material.

8. The piping or production component of claim 6, wherein each of the plurality of grooves has an average maximum depth and each of the first plurality of ribs and the second plurality of ribs has an average maximum width, and wherein the average maximum depth of the plurality of grooves is in the range of 1-3 millimeters and the average maximum width of the first plurality of ribs and the second plurality of ribs is in the range of 1-3 millimeters.

9. The piping or production component of claim 6, wherein the first plurality of ribs and the second plurality of ribs are applied by a cladding machine in an alternating manner wherein during a first pass of the cladding machine one of the first plurality of ribs is applied and during a second pass of the cladding machine one of the second plurality of ribs is applied.

10. The piping or production component of claim 6, wherein the first plurality of ribs and the second plurality of ribs are applied by a dual feed cladding machine that applies one of the first plurality of ribs and one of the second plurality of ribs during a single pass.

\* \* \* \* \*